United States Patent
Rhoads et al.

(10) Patent No.: US 8,126,818 B2
(45) Date of Patent: Feb. 28, 2012

(54) KNOWLEDGE-MANAGEMENT SYSTEMS FOR LAW FIRMS

(75) Inventors: Forrest Rhoads, North Oaks, MN (US); Trace Liggett, Rosemount, MN (US)

(73) Assignee: West Publishing Company, Eagan, MN (US)

( * ) Notice: Subject to any disclaimer, the term of this patent is extended or adjusted under 35 U.S.C. 154(b) by 1023 days.

(21) Appl. No.: 10/751,269

(22) Filed: Dec. 30, 2003

(65) Prior Publication Data

US 2005/0149343 A1    Jul. 7, 2005

Related U.S. Application Data

(60) Provisional application No. 60/437,169, filed on Dec. 30, 2002, provisional application No. 60/480,476, filed on Jun. 19, 2003.

(51) Int. Cl.
*G06Q 50/00* (2006.01)

(52) U.S. Cl. .................. 705/310; 705/311; 707/738

(58) Field of Classification Search .................. 707/1, 2, 707/3, 4
See application file for complete search history.

(56) References Cited

U.S. PATENT DOCUMENTS

| | | | |
|---|---|---|---|
| 5,157,783 A | 10/1992 | Anderson et al. | |
| 5,265,065 A | 11/1993 | Turtle | |
| 5,418,948 A | 5/1995 | Turtle | |
| 5,434,932 A | 7/1995 | Scott | |
| 5,488,725 A | 1/1996 | Turtle et al. | |
| 5,497,317 A | 3/1996 | Hawkins et al. | |
| 5,644,720 A | 7/1997 | Boll et al. | |
| 5,815,392 A | 9/1998 | Bennett et al. | |
| 5,832,494 A | 11/1998 | Egger et al. | |
| 5,859,972 A | 1/1999 | Subramaniam et al. | |
| 5,875,431 A | 2/1999 | Heckman et al. | |
| 5,991,751 A * | 11/1999 | Rivette et al. .................. | 1/1 |
| 6,009,428 A | 12/1999 | Kleewein et al. | |
| 6,556,992 B1 * | 4/2003 | Barney et al. .................. | 1/1 |
| 6,738,760 B1 | 5/2004 | Krachman | |
| 7,062,498 B2 * | 6/2006 | Al-Kofahi et al. .............. | 1/1 |
| 7,529,756 B1 * | 5/2009 | Haschart et al. ............... | 1/1 |
| 7,580,939 B2 * | 8/2009 | Al-Kofahi et al. .............. | 1/1 |
| 7,716,103 B1 * | 5/2010 | Donner .................. | 705/36 R |
| 2002/0055932 A1 | 5/2002 | Wheeler et al. | |
| 2002/0087597 A1 | 7/2002 | Wilson | |
| 2002/0138465 A1 | 9/2002 | Lee et al. | |
| 2002/0143760 A1 | 10/2002 | Kim et al. | |

(Continued)

FOREIGN PATENT DOCUMENTS

AU    2002301438 B2    9/2006

(Continued)

OTHER PUBLICATIONS

"International Search Report, for Application No. PCT/US03/41708, date mailed Nov. 24, 2004", 8 Pages.

(Continued)

*Primary Examiner* — Farhan Syed
(74) *Attorney, Agent, or Firm* — Edwards Wildman Palmer LLP; Barry Kramer; George N. Charles

(57) ABSTRACT

The present inventors devised unique systems, methods, interfaces, and software for managing and leveraging knowledge in law firms and potentially other enterprises. For example, one system provides a single user interface for researching case law for online legal research service and identifying and accessing law-firm documents.

21 Claims, 2 Drawing Sheets

U.S. PATENT DOCUMENTS

| | | | | |
|---|---|---|---|---|
| 2002/0147745 | A1* | 10/2002 | Houben et al. | 707/513 |
| 2002/0165856 | A1* | 11/2002 | Gilfillan et al. | 707/3 |
| 2003/0144969 | A1 | 7/2003 | Coyne | |
| 2004/0095378 | A1 | 5/2004 | Vigue et al. | |
| 2004/0193943 | A1 | 9/2004 | Angelino et al. | |
| 2005/0228788 | A1* | 10/2005 | Dahn et al. | 707/3 |

FOREIGN PATENT DOCUMENTS

| | | |
|---|---|---|
| NZ | 228136 A | 4/1991 |
| NZ | 280973 A | 2/1997 |
| NZ | 298861 A | 1/1999 |
| NZ | 293197 A | 1/2000 |
| NZ | 336782 A | 1/2000 |
| NZ | 503065 A | 8/2001 |
| NZ | 507194 A | 5/2002 |
| WO | WO-9712334 A1 | 4/1997 |
| WO | WO-9855945 A1 | 12/1998 |
| WO | WO-0043918 A2 | 7/2000 |
| WO | WO-0067162 A1 | 11/2000 |
| WO | WO-0077690 A1 | 12/2000 |
| WO | WO-0133349 A2 | 5/2001 |
| WO | WO-0133387 A2 | 5/2001 |
| WO | WO-0167282 A2 | 9/2001 |
| WO | WO-0167282 A2 | 9/2001 |
| WO | WO-0182117 A1 | 11/2001 |
| WO | WO-0201323 A2 | 1/2002 |
| WO | WO-0229623 A1 | 4/2002 |
| WO | WO-0231738 A1 | 4/2002 |
| WO | WO-0244932 A2 | 6/2002 |

OTHER PUBLICATIONS

D'Agostini Bueno, T. C., et al., "JurisConsulto: Retrieval in Jurisprudencial Text Bases using Juridical Terminology", *Proceedings of the Seventh International Conference on Artificial Intelligence and Law*, Oslo, Norway, (1999), 147-155.

"Canadian Application Serial No. 2,512,488, Office Action Mailed Nov. 5, 2008", 6 pgs.

"International Application Serial No. 541580, Examination Report mailed Sep. 24, 2008", 2 pgs.

"New Zealand Application Serial No. 541580, Examiner Report", 2 pgs.

"International Application Serial No. 03800400.8, Supplementary European Search Report mailed Mar. 6, 2008", 4 pgs.

"International Application Serial No. 2512488, Office Action mailed Sep. 11, 2007", 7 pgs.

"International Application Serial No. 541580, Examination Report mailed Feb. 27, 2008", 2 pgs.

"International Application Serial No. 541580, Examination Report mailed Aug. 30, 2006", 2 pgs.

"International Application Serial No. PCT/US03/41708, International Search Report mailed Nov. 24, 2004", 8 pgs.

"Australian Application Serial No. 2003300142, Search Report mailed on Feb. 27, 2009", 2 pgs.

"Knowledge Management in a Law Firm," Upgrade, vol. III, No. 1, Feb. 2002, pp. 51-55.

"KnowMaw: Every Lawyer's Dream—The KM Portal," Computers and Law, vol. 11, No. 5, Dec. 2000-Jan. 2001, pp. 9-11.

"Entwicklungen bei Patentdatenbanken;" NfD, pp. 331-334—(1995).

English translation of "Entwicklungen bei Patentdatenbanken" above.

Canadian Application No. 2,512,488 Office Action mailed Oct. 28, 2009 (9 pages).

Japanese Application No. 2005-508649 Office Action mailed Nov. 17, 2009 together with English translation (10 pages).

Notice of Opposition in New Zealand to Grant of Patent dated Jul. 27, 2008 (1 page).

First Amended Notice of Opposition in New Zealand to Grant of Patent dated Sep. 28, 2009 (13 pages).

Takashi Nemoto, "E-Personnel Development," first edition, Chuokeizai-Sha, Inc., Tokio Yamamoto, May 20, 2002, pp. 97; together with a certified English translation prepared by Kevin Kelley. (Cited against JP 2005-508649.) (9 pages).

"European Application Serial No. 03800400.8, Office Action mailed May 25, 2009", 3 pgs.

* cited by examiner

KNOWLEDGE-MANAGEMENT SYSTEMS FOR LAW FIRMS

RELATED APPLICATIONS

This application claims priority to U.S. Provisional Patent Application 60/437,169, which was filed on Dec. 30, 2002 and to U.S. Provisional Patent Application 60/480,476, which was filed on Jun. 19, 2003. Both of these applications are incorporated herein by reference.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2002, Thomson Legal & Regulatory, Inc.

TECHNICAL FIELD

Various embodiments of the present invention concern information retrieval systems and knowledge-management systems, particularly such systems in a legal-research or law-firm context.

BACKGROUND

The American legal system, as well as some other legal systems around the world, rely heavily on written judicial opinions, the written pronouncements of judges, to articulate or interpret the laws governing resolution of disputes. As a consequence, judges and lawyers within our legal system are continually researching an ever expanding body of past opinions, or case law, for the ones most relevant to resolution or prevention of new disputes. Found cases are studied for relevance and are ultimately cited and discussed in documents, called work product, which, for example, advocate court action, counsel clients on likely court actions, or educate clients and lawyers on the state of the law in particular jurisdictions.

Over time, law firms, particularly large one with scores of lawyers and hundreds of clients, amass large collections of work product. In attempting to manage and leverage the value of these collections, many law firms in the last decade or so have sought to use knowledge-managements systems.

Most, if not all, of these systems have been built around document-management systems (DMSs) that assist in storing, indexing, and searching law-firm documents. The indexing and searching capability of these systems allows lawyers to reuse some of their work product, and thus have in some instances enhanced the efficiency of lawyers in developing new work product.

However, the present inventors have recognized that centering a law firm's knowledge management on document-management systems presents at least two problems. First, the document collections in these systems are generally undisciplined in the sense that they include multiple versions of the same document, non-legal documents, and so forth. Thus, searches in the DMS collections often turn up marginally relevant documents or draft documents that frustrate efforts to quickly identify the high-quality finished documents most likely to have reusable content. Second, even when apparently reusable documents are found, it is necessary for lawyers or other highly trained personnel to assess not only whether their legal arguments are of high quality, but also whether their supporting case law has been overruled, weakened, or otherwise affected by newer case law or other legal developments. (Even with online legal research services, such as the Westlaw online service, that allow one to check the validity of case law on a case-by-case basis,) this assessment is generally time consuming and thus offsets the efficiency gains of reusing work product.

Accordingly, the present inventors have identified a need for better systems, tools, and methods of managing and leveraging the accumulated knowledge within law-firm document collections.

SUMMARY

To address this and/or other needs, the present inventors have devised unique systems, methods, interfaces, and software for managing and leveraging knowledge in law firms and potentially other enterprises. For example, one system provides a single user interface for researching case law for online legal research service and identifying and accessing law-firm documents. The interface allows a user, such as an attorney, to initiate or submit a legal research query and view search results that identify not only relevant external documents from the online legal research service, but also relevant internal documents, such as briefs, client letters, and legal memoranda, from the law firm's own document collection.

Moreover, in this exemplary system, the external and internal documents are displayed with validity indicators, such as color-coded icons, that indicate whether cases they cite are still valid law, enabling the attorney to more readily assess the strength or weakness of each identified document.

Notably, the exemplary embodiment provides a seamless integration of the internal and external documents, yet the internal documents never leave the security of the law firm firewalls.

DETAILED DESCRIPTION OF EXEMPLARY EMBODIMENTS

The following description, which incorporates the figures and the appended claims, describes and/or illustrates one or more exemplary embodiments of one or more inventions. These embodiments, offered not to limit but only to exemplify and teach the invention(s), are shown and described in sufficient detail to enable those skilled in the art to make and use the invention(s). Thus, where appropriate to avoid obscuring the one or more inventions, the description may omit certain information known to those of skill in the relevant art.

Exemplary Information System

Figure 1:
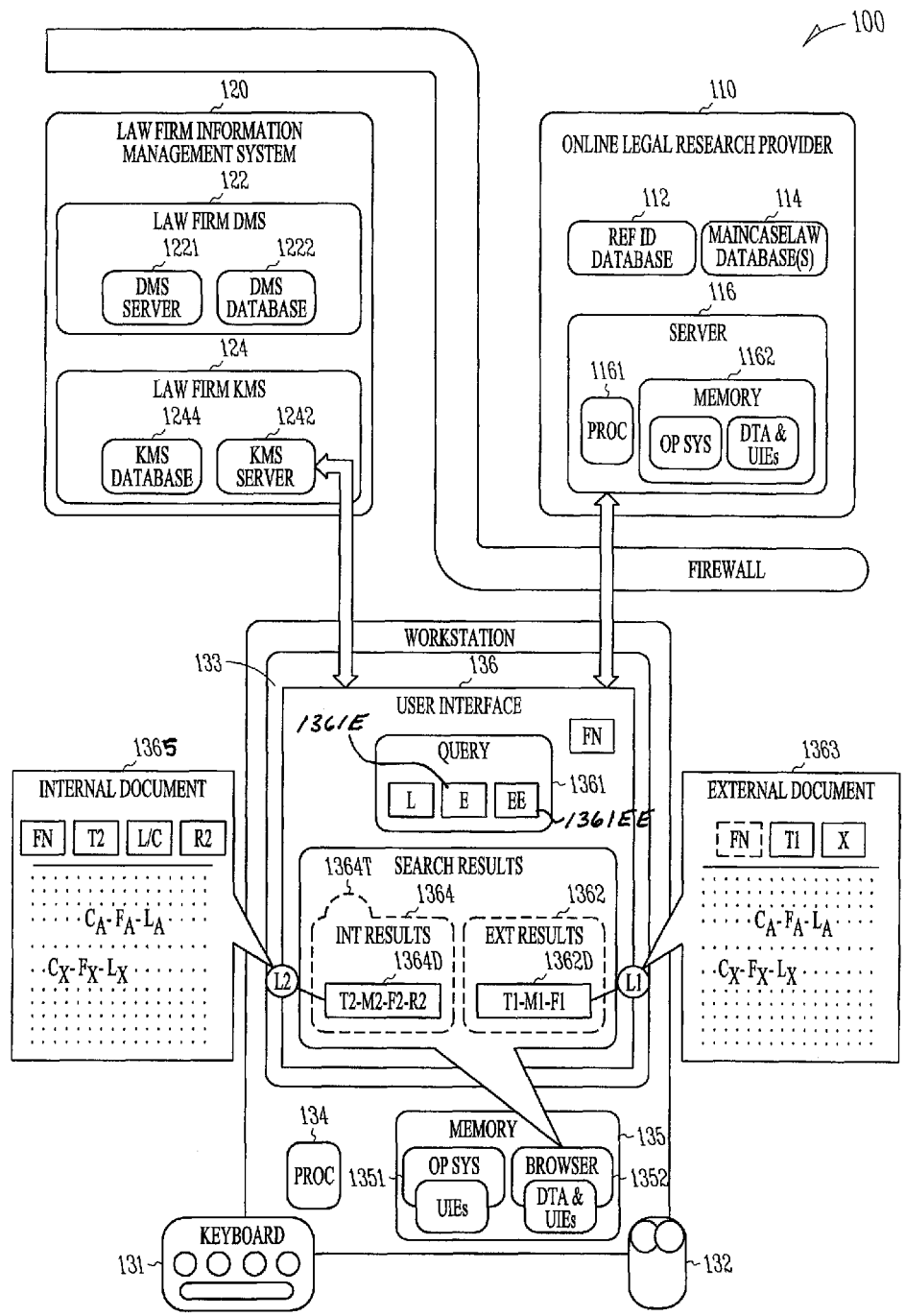
FIG. 1 is a block diagram of an exemplary information system 100 corresponding to one or more embodiments of the present invention.

FIG. 1 depicts an exemplary information retrieval and knowledge management system 100 that incorporates one or more teachings of the present invention. System 100 includes a commercial online legal-data (or research) provider 110, a law-firm information-management system 120, and a client access device 130.

Specifically, commercial online legal data (or research) provider 110 includes main databases 112, reference identification database 114, and server 116. In the exemplary embodiment, main databases 112 contain a wide variety of legal documents, including for example, case law (judicial opinions), legislation, and journal articles. Reference identification database 114 includes a list of document identifiers and corresponding citations, with each document identifier and citation corresponding to a document within main databases 112. Databases 112 are coupled to server 116.

Server 116, representative of one or more servers, includes a processing unit 1161, and a memory 1162. Memory 1161, which can take the form of an electronic, magnetic, or optical computer- (or machine-) readable medium, includes one or more one or more search engines, and other modules and software, such as browser-compatible user-interface elements (UIEs) for receiving and fulfilling queries from clients.

In the exemplary embodiment, server 116 serves active or dynamic content in the form of hypertext markup language (HTML), extensible markup language (XML), or more generally a markup-language, documents or pages. To this end, the exemplary server supports the following web services or protocols: TCP/IP, SOAP (HTTP, HTML, XML), and UDDI. Additionally, the UIEs of server 116 include one or more Java scripts, applets, or other related software and data structures for serving data in association with desired interactive control or user-interface features, objects, modules, or elements. (In some embodiments, the HTML pages include URL or other embedded instructions that include one or more portions of queries submitted from an access device, such as access device 130.) These features work in conjunction with client processor and software platforms to define one or more portions of a browser-based graphical user interface for legal research. Server 116 is coupled or couplable, for example, via an Internet Protocol (IP) network, to law-firm information-management system 120.

Law-firm information-management system 120 includes a document-management subsystem 122, and a knowledge-management subsystem 124. Document-management subsystem (DMS) 122 includes a DMS database server 1221 and a DMS database 1222. DMS database 1222 includes internal firm work-product documents, such as briefs, legal memorandum, opinions, letters, and multiple versions of same in multiple stages of completion. It may also include non-legal materials. The contents of the DMS database are generally associated with metadata profiles indicating authors, creation dates, update dates, client numbers, security settings, access restrictions and so forth.

Knowledge management subsystem (KMS) 124 includes a KMS server 1242 and a KMS database (or document repository) 1244. KMS server 1242, which may present one or more servers depending on loading and performance issues, includes a full-text index module, an engines-and-applications module, an HTML library module, a metadata database module, a citation index module, and a usage-and-tracking module, all of which are not shown as separate items in FIG. 1.

In the exemplary embodiment, full-text-indexer module is used to facilitate general retrieval of documents from KMS database by indexing documents and/or providing index data. Engines-and-applications module includes the following engines and applications: citation-identification engine, full-text search engine, KeyCite Flags engine (see appendix for further details); scheduler application for handling migrating documents from DMS database, DMS integration components, and system administration tools.

HTML library module stores HTML version of each document contained in the research repository, including KeyCite flags and tags. Metadata database module 1242D stores descriptive information and attributes of documents contained in the KMS database, includes information from the DMS database. Citation index module indexes the citations relationships between documents to maintain flags and tags on citations. And, usage-tracking database stores and maintains a historical log of all search and retrieval activity containing detail information by document name, author, area of law, and user ID.

KMS database stores a selected set of high-quality internal work-product documents. In the exemplary embodiment, these documents are copies of documents selected from DMS database 1222. When copied into KMS database 1244, one or more portion of the metadata profile data is also incorporated into KMS database.

Law-firm information-management system 120 and online legal-research provider 110 are both communicatively coupled or couplable, via a local-area network (such a corporate intranet) or wide-area network (such as the Internet) to access device 130.

Access device 130, which is generally representative of one or more access devices within a business organization, such as a law firm, takes the exemplary form of a workstation. In addition to a keyboard 131 (lower left hand corner), a mouse (graphical pointer) 132, and a display 133, access device 130 includes a processing unit 134, a memory module 135, and a browser-compatible legal-research interface 136.

More particularly, processing unit 134 includes at least one processing circuit. Memory module 135, which takes the form of one or more electronic, magnetic, optical machine-readable mediums, includes operating system 1351, a browser application 1352, and a word processor application 1353.

Operating system 1351, which cooperates with processing unit 134 and takes the exemplary form of the Microsoft Windows operating system, includes a set of user-interface objects, modules, or elements, accessible via application programs such as browser application 1352. Browser application 1352 takes exemplary form of a Microsoft Internet Explorer™ or Netscape Navigator browser, cooperates with operating system 1321 and externally provided data, coded instructions (collectively UIEs) from servers such as (external legal-research) server 116 and internal KMS server 1242, to define and render, on display 133, browser-compatible legal-research interface 136.

Legal-research interface 136 includes a query portion 1361, an external re-results portion 1362, an external document display portion 1363, an internal-results portion 1364, and an internal document display portion 1365. In the exemplary embodiment, portions 1361-1365 are not necessarily displayed or accessed simultaneously. For example, the interface can include tabs and full-screen-display options that enable the user to focus the display on particular portion of the data or interface portions. One embodiment provides one folder tab to invoke display of a combined listing of internal and external results with corresponding indicators to distinguish internal results from external ones and the other to invoke display of internal results only.

Query portion 1361 includes a label portion L and one or more associated interactive user-interface (UI) elements (objects, features, or widgets), E and EE (referred to hereinafter as label portion 1361L, and elements 1361E and 1361EE.) Label portion 1361L is defined to display a query-indicator label, such as "Search Based on this New Citation," "KeyCite this Citation, or "Search these Databases," to indicate to a user that some form of query input is expected within this portion of the interface. UI element 1361E accepts input from a user. In the exemplary embodiment, this UI element takes the form of a text box or menu, with the menu enabling the use to select a target for the query, such as the KMS database. As a default, the exemplary embodiment will run the query against the KMS database in combination with any other database set that is selected. (Some embodiments provide a set of UI elements that enable the user to select from a number of predefined category- or subject-matter-specific queries. The queries are defined, for example, by expert legal researches in the specific legal areas. A hierarchical organization or outline of the queries facilitates user selection of the appropriate query by the user. The user may also view the details of the predefined queries and modify as desired prior to submission.)

UI element 1361EE allows a user to initiate submission and execution of a query defined via user-interface element 1361E. The exemplary embodiment provides this feature in the form of a "go" button, which upon actuation results in transmission of the defined query (or relevant portion of it) to not only main database 112 (server 116), but also to KMS database XYX for fulfillment. (In some embodiments, the query is submitted only to KMS database XYX.)

External-results portion 1362 is defined to display search results obtained or received from online legal-research provider 110, or more precisely its main database 112. In the exemplary embodiment, external-results portion 1362 includes one or more document identifiers or descriptors 1362D which are displayable in association with corresponding user-interface element L1. Descriptor 1362D provides information regarding a corresponding external-results document within database 112. In the exemplary embodiment, this information includes a title T1, metadata M1, and a case validity flag F1. UI element L1, for example a hyperlink, provides an option which can be invoked for example, by clicking, to retrieve and display the document(s) associated with descriptor 1362D, as indicated by document display 1363.

Document display 1363, which in some embodiments is presented in a spit-screen along a listing of the internal and/or external results, displays at least a portion of the external document associated with UI element L1. The document includes text (denoted by the broken lines) and legal citations CA and CB, which are respectively associated with case-validity flags FA and FB and hyperlinks LA and LB. Selection of hyperlinks LA and LB all a user retrieve the documents corresponding to the citations from online legal-research provider 110.

Internal-results portion 1364 is defined to display results of querying internal firm database, KMS database 1244. In the exemplary embodiment, internal-results portion 1364 includes one or more sets of document-specific UI elements, such as UI element set 1364D, one or more of which are displayable in association with a corresponding UI element L2. Each UI-element provides data or access to data about the contents of an associated internal-results documents, such as a document title T2, metadata M2, case-law validity flag F2, and law-firm rating R2.

More precisely, metadata M2 includes one or more portion of the metadata associated with the original DMS copy of the identified document. (The exemplary embodiment populates KMS database with copies of documents selected from DMS database.) In the exemplary embodiment, this includes author, client, document ID, dates of creation and revision, etc. Case-law validity flag F2 provides an indication of the validity of case law cited within the corresponding firm document. Law-firm rating R1 provides an indication of the utility and/or quality of the document as determined by previous law-firm users of the document.

UI element L2, similar to UI element L1, provides a user option to retrieve and display the internal document(s) associated with descriptor 1364D. Exercising this option results in a display document display 1365.

Document display 1365, which in some embodiments is presented in a spit-screen along a listing of the internal and/or external results, displays at least a portion of the internal document associated with UI element L2. The document includes text (denoted by the broken lines) and legal citations CA and CX, which are respectively associated with case-validity flags FA and FB and hyperlinks LA and LX. In addition to providing a visual indication of case-law validity, the case-validity flags can be selected in some embodiments to cause retrieval and/or display of further information regarding the nature of the flags. Hyperlinks LA and LX all a user retrieve the documents corresponding to the citations from online legal-research provider 110. In addition to the text and citations, document display 1365 provides a firm-name label FN to clearly identify the document as an internal law firm document, a title label T2 for indicating the title of the corresponding internal document, and a load-copy UI element LC for enabling user to initiate loading of a copy of the corresponding internal document directly into a word processor application of access device 130 for use in generating a new work product document. Moreover, document display portion 1365 also includes a ratings UI-element R1 which enables a user to see the current law-firm-user rating of the document as well as to rate the current document. Figure X shows an exemplary set of UI elements for achieving this rating.

Exemplary Method of Operation

Figure 2:
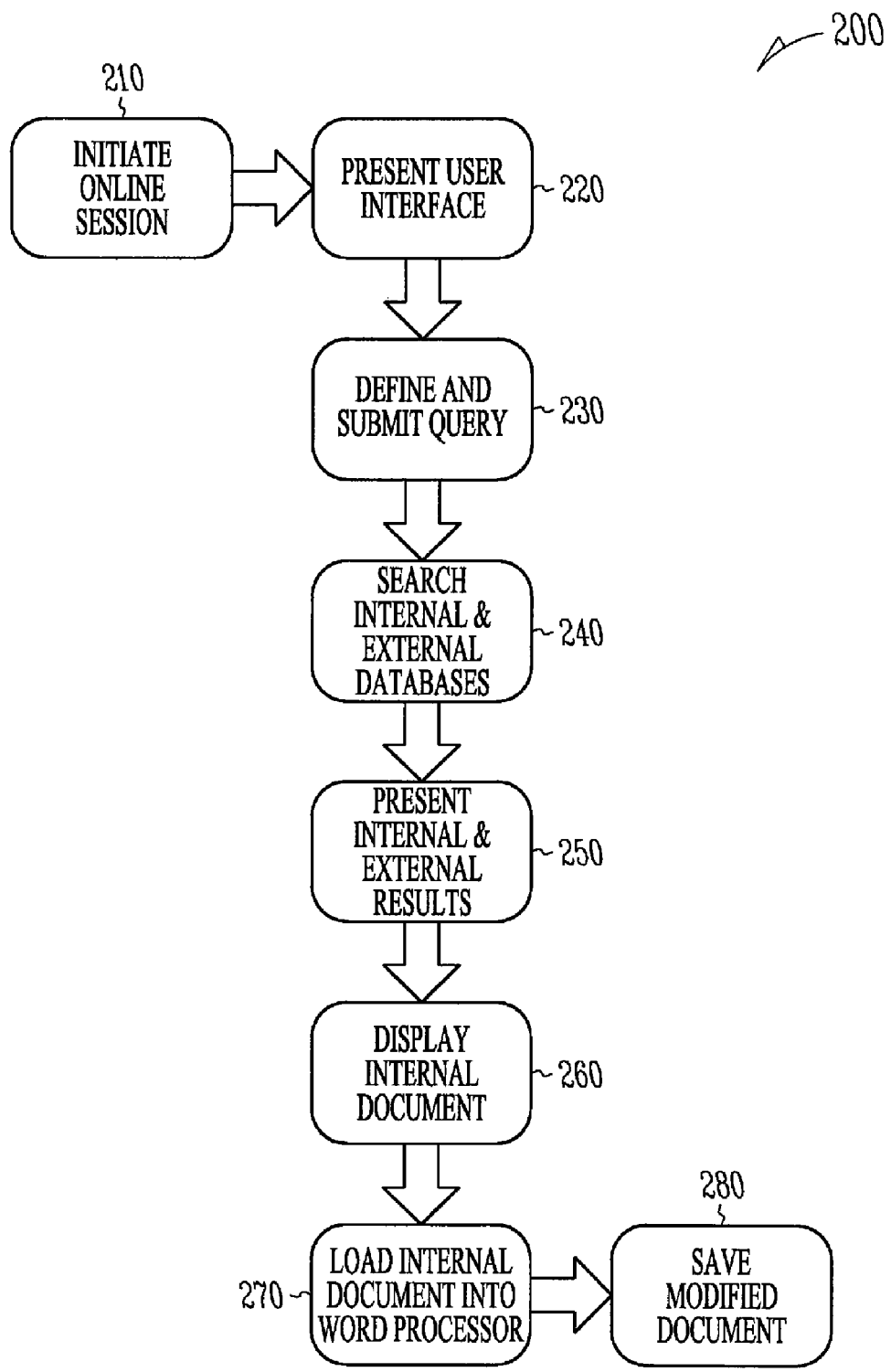
FIG. 2 is a flow chart corresponding to one or more exemplary methods of operating an information system and associated components that embody the present invention.

FIG. 2 shows a flow chart 200 of one or more exemplary methods of operating an information-management system, such as system 100. Flow chart 200 includes blocks 210-280, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. Moreover, still other embodiments implement the blocks as two or more interconnected hardware modules with related control and data signals communicated between and through the modules. Thus, the exemplary process flow applies to software, hardware, and firmware implementations.

At block 210, the exemplary method begins with a law-firm user, such as an attorney or paralegal, initiating a search session with online legal-research system 110. In the exemplary embodiment, this entails the user at access device 130 logging onto a law-firm network using security measures, such as an assigned username and password. After login, the user then launches and directs the Internet browser within access device 130 to connect to the online legal research system. In some embodiments, the user enters a separate username and password to initiate the search session, and in others the previous network login suffices. Execution continues at block 220.

Block 220 entails displaying or otherwise loading and presenting one or more portions of legal-research user interface 156. In the exemplary embodiment, this entails server 116 of online legal-research system 110 sending an HTML document (or webpage) that includes scripts, applets, and associated data for causing access device 130 to display query portion 1361 of user interface 136. For users at law firms that have a knowledge management system, such as management system 100, which is provided or authorized by the online legal research system, the associated data includes at least one firm-name label to use in labeling specific portion of the user interface as well as the name of KMS server 1242, which is configured and/or authorized to access KMS database 1244. Execution continues at block 230.

Block 230 entails the user defining and submitting a query. In the exemplary embodiment, this entails the user defining a query using query portion 1361 of interface 136. Query portion includes features, such as a text box or pull-down menus that enable the user to define a citation, natural-language, or terms-and-connectors query. The interface also presents the user an option to specify the scope of the search or query as including one or more databases within online legal research system and/or at least one internal law firm database. Options related to identifying the internal law firm databases are labeled based on the firm-name label provided by the online legal research system. After defining the query, the user submits it to system by actuating a UI element, such as a "go" button, using an input device, such as a mouse or keyboard. The query is then communicated over the Internet to server 116 and KMS server 1242.

Block 240 entails searching databases at one or both of the online legal search system and the law-firm information management system based on the submitted query. In the exemplary embodiment, online legal-search system 110, or more precisely, server 116 executes or causes execution of the query against the requested databases, and returns results the search (external results) to access device 130 in the form of HTML documents with associated control features and data. If the query was defined to include law-firm databases, an applet, script or other device is returned along with the external results of access device 130 to trigger or cause access device to call KMS server 1242 to execute the query against an internal law-firm database, such as KMS database 1244. Some embodiments may call the KMS server concurrently with submission of a query identifying an internal law-firm database. In any case, KMS server executes the search against the KMS databases and serves results in the form of a markup language document, such as HTML, to access device 130. Execution of the exemplary method continues at block 250.

Block 250 entails presenting the search results. In the exemplary embodiment, this presentation entails presenting the internal results and the external results via the browser interface in association with one or more sets of UI elements (or interactive control features), as shown in FIG. 1.

Block 260 entails displaying an internal law-firm document from internal results set. In the exemplary embodiment, this entails the user selecting a UI element, such a link, associated with one of the listed internal documents and the KMS server retrieving the document from the KMS database and serving it to the access device. Notably, the KMS server automatically updates the document to the current state of the law—that is, current validity flags are inserted next to all of the authorities in the document. The KMS server requests these from the online legal-research provider—in real time—an inserts them prior to serving up the pages to the access device. Another feature of this interface allows the use to click on an UI element and move the mouse cursor to each place in the document that contained terms from the search, for example, a citation in the case of a citation search.

Block 270 entails loading the displayed internal document into a word-processing application program. In the exemplary embodiment, this entails the user selecting a "load copy" icon LC on the internal-document display portion 1365 of interface 136. In response, user interface 136, which includes an appropriate application program interface, launches or otherwise communicates with the word-processing application to load the document from interface 136 into the word-processing application for user modification. In response, tracking system data within KMS server 1242 is also updated to reflect usage of this internal document. (The exemplary system generally tracks everytime a user clicks on something, specifically creating a usage record indicating the date, time, user, client-mater, type of transaction.)

Block 280 saves the modified copy of the internal document in the DMS database as a new work product document. In the exemplary embodiment, this entails the user also providing metadata profile data for the new document.

Exemplary Method of Building the Research Repository

In the exemplary system of FIG. 1, knowledge-management subsystem 120 includes KMS database 1244, which serves as a research repository of documents selected from DMS database 1224. KMS server 1242 includes software (that is, coded instructions) for automatically migrating or mirroring select documents from firm's DMS or network file system to the KMS database 1242.

In the exemplary embodiment, this migration process initially entails retrieving one or more documents from DMS database, for example, using administrator defined queries and executing those queries on a scheduled basis or event-driven basis. Next, the exemplary method entails converting the retrieved documents into a markup language, such as HTML, subsequently indexing the converted documents based on citations and text. The next series of operations include storing citation relationships, storing the HTML documents with tagged citations, and storing document profile data all in a relevant portion of the KMS server.

Conclusion

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

The invention claimed is:

1. A server for facilitating a knowledge management system, wherein the server communicates with client computers via a distributed computing network, and wherein the server comprises:
(a) a memory storing an instruction set, a first database related to work-product documents of a law firm, and a second database related to non-work-product legal precedence; and
(b) a processor for running the instruction set, the processor being in communication with the memory and the distributed computing network, wherein the processor is operative to perform the following steps:
(i) receive a query from an agent of a law firm operating one of the client computers, wherein the processor receives the query and provides, to the agent for display on a graphical user interface, a taxonomy of legal topics for selection by the agent, with selection of one or more of the legal topics indicative of the query being received;

(ii) search the first and second databases for content related to the query;

(iii) retrieve a first set of work-product documents of the law firm from the first database based upon the search step, wherein the first set of work-product documents is stored in a third database in one of the client computers, wherein the first set of work product documents is converted into a markup language and subsequently indexed based on legal citations and text to permit the work product documents to be searched, and the work-product documents are internal law-firm content;

(iv) retrieve a second set of non-work-product legal precedence from the second database based upon the search step; and (v) provide, to the agent for display on a graphical user interface, at least a portion of the work-product documents and the non-work-product legal precedence from the first and second sets including citations within the work-product documents and the non-work-product legal precedence, wherein at least one of the citations is associated with an indicator of current reliability of a corresponding document as a legal authority, wherein each provided work-product document is associated with a depth-of-treatment indicator indicating a degree to which the provided work-product document treats a legal case and one or more of the provided work-product documents are associated with a feedback indicator selected to view one or more user comments on the one or more listed work-product documents.

2. The server as recited in claim 1, wherein the internal law-firm content includes briefs, client letters and legal memoranda.

3. The server as recited in claim 1, wherein the degree is qualitative as determined by previous users of the provided work-product documents.

4. The server as recited in claim 1, wherein the degree indicates a quantity.

5. The server of claim 1, wherein the first and second databases are separated by a firewall.

6. The server of claim 1, wherein the second database is part of an online pay-for-access legal research service.

7. The server of claim 1, wherein each provided work-product document is associated with an indicator identifying an author of the document, an office location of the author, and an identification of documents within a document management system for the law firm.

8. The server of claim 1, wherein the query includes an identification of a legal case.

9. The server of claim 1, wherein the server is further operative to perform the step of providing, to the agent for display on a graphical user interface, at least a portion of each document found by the search step.

10. The server of claim 1, wherein the server is further operative to perform the step of providing, to the agent for display on a graphical user interface, a displayable table of authorities listing documents cited within a work-product document selected from within the first set.

11. The server of claim 1, wherein the server is further operative to perform the step of providing, to the agent for display on a graphical user interface, a listing of other documents citing the selected work-product document.

12. The server of claim 1, wherein each portion of the documents in the search step includes a selection device for invoking display of text of the document, with text including one or more selectable citations to other corresponding documents and with each citation associated with an indicator of current reliability of a corresponding document as a legal authority.

13. The server of claim 1, wherein at least a portion of the metadata profile data of the work product documents are incorporated into the converted work product documents.

14. A computer-implemented method for facilitating a knowledge management system in a distributed computing network have a server in communication with client computers, and memory storing a first database related to work-product documents of a law firm, and a second database related to non-work-product legal precedence, wherein the method comprises the steps of:

(a) receiving a query at the server from an agent of a law firm operating one of the client computers, (b) providing, to the agent for display on a graphical user interface, a taxonomy of legal topics for selection by the agent, with selection of one or more of the legal topics indicative of the query being received;

(c) searching the first and second databases for content related to the query;

(d) retrieving a first set of work-product documents of the law firm from the first database based upon the searching step;

(e) storing the first set of work-product documents in a third database in one of the client computers;

(f) converting the first set of work product documents into a markup language and subsequently indexing the first set based on legal citations and text to permit the first set of work product documents to be searched, wherein the work-product documents are internal law-firm content;

(g) retrieving a second set of non-work-product legal precedence from the second database based upon the searching step; and (h) providing at least a portion of the work-product documents and the non-work-product legal precedence from the first and second sets including citations within the work-product documents and the non-work-product legal precedence, wherein at least one of the citations is associated with an indicator of current reliability of a corresponding document as a legal authority, and each provided work-product document is associated with a depth-of-treatment indicator indicating a degree to which the provided work-product document treats a legal case and one or more of the provided work-product documents are associated with a feedback indicator selected to view one or more user comments on the one or more listed work-product documents.

15. The computer-implemented method of claim 14, wherein the second database is part of an online pay-for-access legal research service, each provided work-product document is associated with an indicator identifying an author of the document, an office location of the author, and an identification of documents within a document management system for the law firm, and the query includes an identification of a legal case.

16. The computer-implemented method of claim 14, further comprising the steps of:

providing, to the agent for display on a graphical user interface, at least a portion of each document found by the search step; and providing, to the agent for display on a graphical user interface, a displayable table of authorities listing documents cited within a work-product document selected from within the first set.

17. The computer-implemented method of claim 14, further comprising the step of providing, to the agent for display on a graphical user interface, a listing of other documents citing the selected work-product document, wherein each portion of the documents in the search step includes a selection device for invoking display of text of the document, with text including one or more selectable citations to other corresponding documents and with each citation associated with an indicator of current reliability of a corresponding document as a legal authority, and wherein at least a portion of the metadata profile data of the work product documents are incorporated into the converted work product documents.

18. A non-transitory computer-readable medium whose contents cause a distributed computer network to perform a method for facilitating a knowledge management system, the distributed computing network having a server in communication with client computers, and memory storing a first database related to work-product documents of a law firm, and a second database related to non-work-product legal precedence, the distributed computer network having a server program and a client program with functions for invocation by performing the steps of:

(a) receiving a query at the server from an agent of a law firm operating one of the client computers, (b) providing, to the agent for display on a graphical user interface, a taxonomy of legal topics for selection by the agent, with selection of one or more of the legal topics indicative of the query being received;

(c) searching the first and second databases for content related to the query;

(d) retrieving a first set of work-product documents of the law firm from the first database based upon the searching step;

(e) storing the first set of work-product documents in a third database in one of the client computers;

(f) converting the first set of work product documents into a markup language and subsequently indexing the first set based on legal citations and text to permit the first set of work product documents to be searched, wherein the work-product documents are internal law-firm content;

(g) retrieving a second set of non-work-product legal precedence from the second database based upon the searching step; and (h) providing at least a portion of the work-product documents and the non-work-product legal precedence from the first and second sets including citations within the work-product documents and the non-work-product legal precedence, wherein at least one of the citations is associated with an indicator of current reliability of a corresponding document as a legal authority, and each provided work-product document is associated with a depth-of-treatment indicator indicating a degree to which the provided work-product document treats a legal case and one or more of the provided work-product documents are associated with a feedback indicator selected to view one or more user comments on the one or more listed work-product documents.

19. The non-transitory computer-readable medium of claim 18, wherein the second database is part of an online pay-for-access legal research service, each provided work-product document is associated with an indicator identifying an author of the document, an office location of the author, and an identification of documents within a document management system for the law firm, and the query includes an identification of a legal case.

20. The non-transitory computer-readable medium of claim 18, further comprising the steps of:

providing, to the agent for display on a graphical user interface, at least a portion of each document found by the search step; and providing, to the agent for display on a graphical user interface, a displayable table of authorities listing documents cited within a work-product document selected from within the first set.

21. The non-transitory computer-readable medium of claim 18, further comprising the step of providing, to the agent for display on a graphical user interface, a listing of other documents citing the selected work-product document, wherein each portion of the documents in the search step includes a selection device for invoking display of text of the document, with text including one or more selectable citations to other corresponding documents and with each citation associated with an indicator of current reliability of a corresponding document as a legal authority, and wherein at least a portion of the metadata profile data of the work product documents are incorporated into the converted work product documents.

* * * * *